US012783473B2

(12) United States Patent
Rao et al.

(10) Patent No.: US 12,783,473 B2
(45) Date of Patent: Nov. 3, 2026

(54) FOREIGN DATA WRAPPER DATA SOURCE MANAGEMENT FOR IT LLMS

(71) Applicant: NeuBird Inc., San Mateo, CA (US)

(72) Inventors: Goutham Rao, Los Altos, CA (US); Vinod Jayaraman, San Francisco, CA (US)

(73) Assignee: NEUBIRD INC., San Mateo, CA (US)

( * ) Notice: Subject to any disclaimer, the term of this patent is extended or adjusted under 35 U.S.C. 154(b) by 0 days.

(21) Appl. No.: 19/067,582

(22) Filed: Feb. 28, 2025

(65) Prior Publication Data

US 2025/0355840 A1 Nov. 20, 2025

Related U.S. Application Data

(60) Provisional application No. 63/649,884, filed on May 20, 2024.

(51) Int. Cl.

*G06F 7/00* (2006.01)
*G06F 16/21* (2019.01)
*G06F 16/2458* (2019.01)
*H04L 41/40* (2022.01)

(52) U.S. Cl.

CPC ........ *G06F 16/211* (2019.01); *G06F 16/2458* (2019.01); *H04L 41/40* (2022.05)

(58) Field of Classification Search

CPC ..... G06F 16/211; G06F 16/2458; H04L 41/40
USPC .................................................. 707/600-899
See application file for complete search history.

(56) References Cited

U.S. PATENT DOCUMENTS

2025/0258819 A1* 8/2025 Jain .................. G06F 16/24542

OTHER PUBLICATIONS

AWS Prescriptive Guidance: Integrating Amazon Aurora PostgreSQL Compatible with heterogeneous databases and AWS services, Aug. 22, 2024, 75 pgs.
F.A. Campos Montero, et al., "SchemaGAN: A Conditional Generative Adversarial Network for Geotechnical Subsurface Schematisation", Computers and Geotechnics 183 (2025) 107177, 14 pgs.
Jeffrey V. Nickerson, et al., The Spatial Nature of Thought: Understanding Information Systems Design Through Diagrams, Twenty Ninth International Conference on Information Systems, Paris 2008, 19 pgs.
Miguel A. Guinea-Cabrera, et al., "Digital Twins in Software Engineering—A Systematic Literature Review and Vision", Appl. Sci. 2024, 14(3), 977; https://doi.org/10.3390/app14030977, 37 pgs.
Moe Kayali, et al., "Mind the Data Gap: Bridging LLMs to Enterprise Data Integration", CIDR'25, Jan. 19-22, 2025, Amsterdam, The Netherlands, 6 pgs.

(Continued)

*Primary Examiner* — Isaac M Woo
(74) *Attorney, Agent, or Firm* — Kwan & Olynick LLP

(57) ABSTRACT

Methods and apparatus for implementing a framework for managing IT telemetry data through Foreign Data Wrappers (FDWs) such as PostgreSQL FDWs are provided. The framework allows for the integration of diverse data sources from multiple IT platforms, such as AWS, Microsoft Azure, Google Cloud, and VMware, into a unified FDW database. Data is dynamically schematized into virtual tables, allowing Large Language Models (LLMs) to efficiently analyze the telemetry data, generate actionable insights for IT operations, and improve the overall efficiency of IT monitoring and troubleshooting processes.

20 Claims, 9 Drawing Sheets

(56) References Cited

OTHER PUBLICATIONS

Nick C. Ellis, “At the Interface: Dynamic Interactions of Explicit and Implicit Language Knowledge”, Cambridge University Press 0272-2631/05, 2005, 48 pgs.

Vorgelegt Von, et al., “Cumulative Learning and Schematization in Problem Solving”, Inagural-Dissertation, Oct. 16, 2022, 271 pgs.

* cited by examiner

FOREIGN DATA WRAPPER DATA SOURCE MANAGEMENT FOR IT LLMS

TECHNICAL FIELD

This disclosure generally relates to Information Technology (IT) and Large Language Models (LLMs), and more specifically data analysis and IT Generative Operations (GenOps).

BACKGROUND

Observability and monitoring in IT operations (IT Ops) are becoming increasingly costly and resource intensive due to a number of factors including the complexity of IT environments, vast amounts of data, stringent service level agreements (SLAs), security requirements, and skilled personnel shortages. IT Ops spend now makes up a substantial part of enterprise IT spending.

Some efforts have been made to develop automated tools for monitoring increasingly complex IT environments. Some of these tools may be specific to particular inhouse or cloud IT platforms, such as Amazon Web Services (AWS), Microsoft Azure, VMWare, MangoDB Atlas, Prometheus, etc. Other efforts have been made to leverage open-source solutions, to reduce the number of IT platforms, or to unify particular sets of services or consolidate monitoring tools. Each of these approaches can decrease the cost of IT Ops, but have a variety of drawbacks and limitations. Consequently, there is a persistent need to enhance and improve IT Ops.

DETAILED DESCRIPTION

Figure 1:
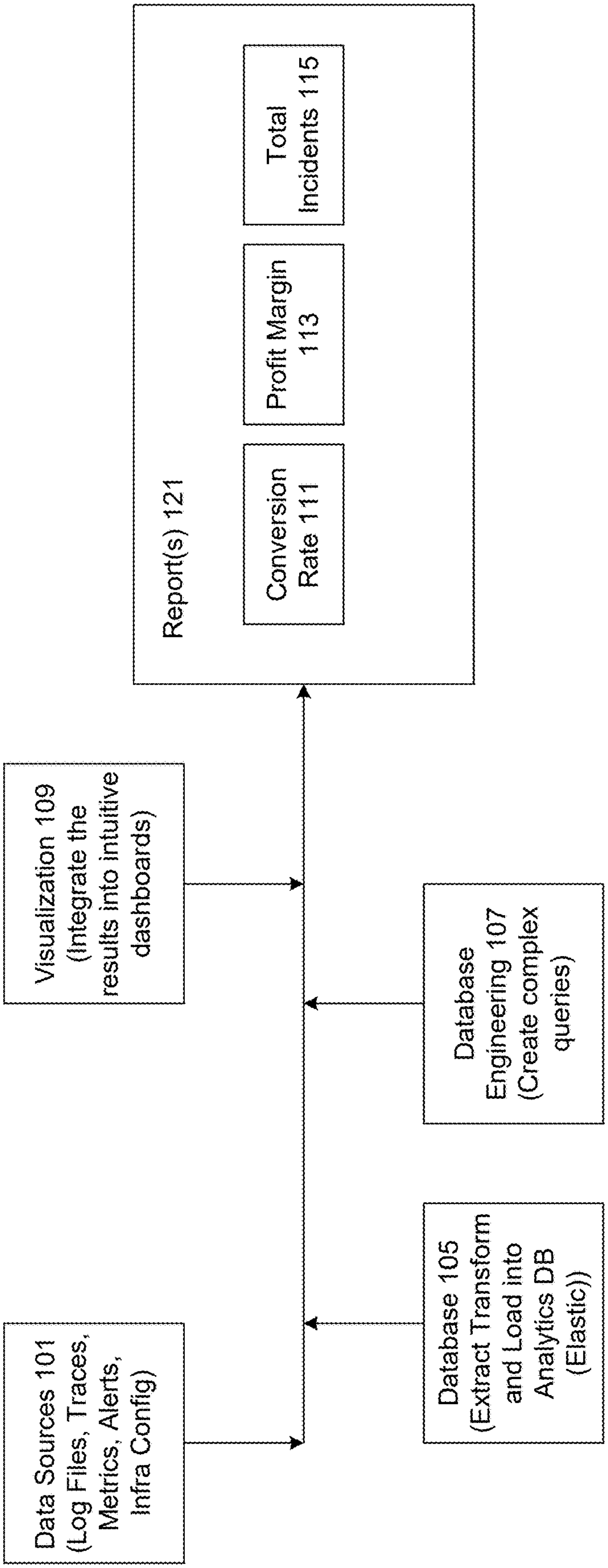
FIG. 1 illustrates an example of a system for IT operations (IT Ops).

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of IT Ops. However, it should be noted that the techniques of the present invention apply to a wide variety of different environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, observability may include a variety of specific metrics. However, it will be appreciated that a system can use variety of different types of data while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, different layers may be connected using a variety of materials. Consequently, a connection does not necessarily mean a direct, unimpeded connection unless otherwise noted.

Current observability and monitoring practices have become exceedingly complex due to the multitude of data sources that need to be managed. These data sources may be inhouse platforms as well as disparate cloud IT platforms such as Amazon Web Services (AWS), Microsoft Azure, Google Cloud, IBM Cloud, Splunk, MangoDB Atlas, Snowflake Data Cloud, Elasticsearch, Redis, Influx, Prometheus, VMWare, etc. These disparate IT platforms or data sources may include IT telemetry data associated with logs, traces, metrics, alerts, system configurations, and infrastructure configurations, etc., providing critical insights into different aspects of IT operations. However, the sheer volume and variety of data can create significant challenges in terms of data extraction, loading, analysis, and visualization.

Firstly, data from these disparate IT platforms must be extracted and loaded into an analytics database. This extraction and loading process sometimes referred to as ETL (extract, transform, load), is resource-intensive and time-consuming. It requires specialized tools and processes to ensure data is correctly ingested without loss or corruption. Managing the ETL pipeline effectively demands substantial IT resources.

Custom and often complex queries are required to derive meaningful insights from the data once the data has been loaded into a database. Setting up dashboards and visualizations to present data effectively is another layer of complexity.

1 is a diagrammatic representation illustrating an example of IT Ops inefficiency. The end-to-end cycle from data extraction to visualization is not only time-consuming but also continuous and iterative. As new data flows in, the ETL pipelines need to be updated, queries must be adjusted, and dashboards modified. This perpetual cycle consumes significant time and resources, leaving IT teams in a constant state of catch-up rather than proactive management. It should be noted that Site Reliability Engineering (SRE) is sometimes referred to as a different area over lapping IT Ops. SRE generally focuses on reliability, scalability, and automation. However, as used herein, IT Ops encompasses SRE.

Various inefficiencies exist IT observability and monitoring workflows, emphasizing the complexity and resource-intensive nature of IT operations (IT Ops). At the foundation of IT monitoring are various data sources 101 that continuously generate vast amounts of telemetry data, including log files, system traces, performance metrics, alerts, and infrastructure configurations. These disparate sources provide critical insights into IT system health but present significant challenges in aggregation, correlation, and real-time analysis due to their sheer volume and variety. Managing these sources requires IT personnel to collect and process raw data before meaningful insights can be derived.

According to various embodiments, data 101 is extracted, transformed, and loaded (ETL) into an analytics database 105. This process involves retrieving raw data from multiple IT platforms, standardizing and cleaning it to ensure consistency, and then storing it in an optimized format for query execution. The ETL stage is a resource-intensive step in IT monitoring, demanding specialized tools and substantial computational resources. Once stored, database engineers 107 is used to develop complex queries to extract relevant insights. These queries often require expertise in structured query languages (SQL, NoSQL) and indexing strategies to improve performance, making this stage another bottleneck in IT operations. Furthermore, as IT conditions evolve, queries must be continuously refined, adding to the inefficiency.

After data retrieval, results are integrated into visualization dashboards 109, where IT teams analyze key performance indicators (KPIs), detect anomalies, and monitor system trends. However, dashboards present challenges due to fragmentation across different platforms, reliance on static query templates, and delays caused by the time-consuming ETL and query execution processes. These limitations prevent IT teams from gaining real-time insights, forcing them to react to problems rather than proactively addressing potential issues.

IT monitoring workflows then generate reports 121, which may summarize key business and operational metrics such as conversion rate (111), profit margin (113), and total incidents (115). These reports provide valuable insights for IT and business stakeholders, helping them assess the impact of IT performance on business outcomes. However, the manual effort required to refine reporting mechanisms and the lag in data availability hinder timely decision-making, leading to increased operational costs and inefficiencies.

Moreover, the fragmented nature of the process, including handling multiple tools for extraction, database management, and visualization, adds to the inefficiency. Each tool might require different expertise, and ensuring seamless integration between them can be challenging. This fragmentation often leads to delays and potential data discrepancies, reducing the overall effectiveness of the observability and monitoring efforts.

IT observability and monitoring suffer from data fragmentation, high operational costs, delayed insights, complex troubleshooting, and scalability challenges. IT teams must manually process, extract, query, and visualize data across multiple tools, making real-time monitoring difficult. These inefficiencies underscore the need for a more automated and structured approach to IT operations, such as IT Generative Operations (IT GenOps), which leverages Large Language Models (LLMs) and dynamic schematization to streamline diagnostics, improve accuracy, and reduce operational overhead.

Figure 2:
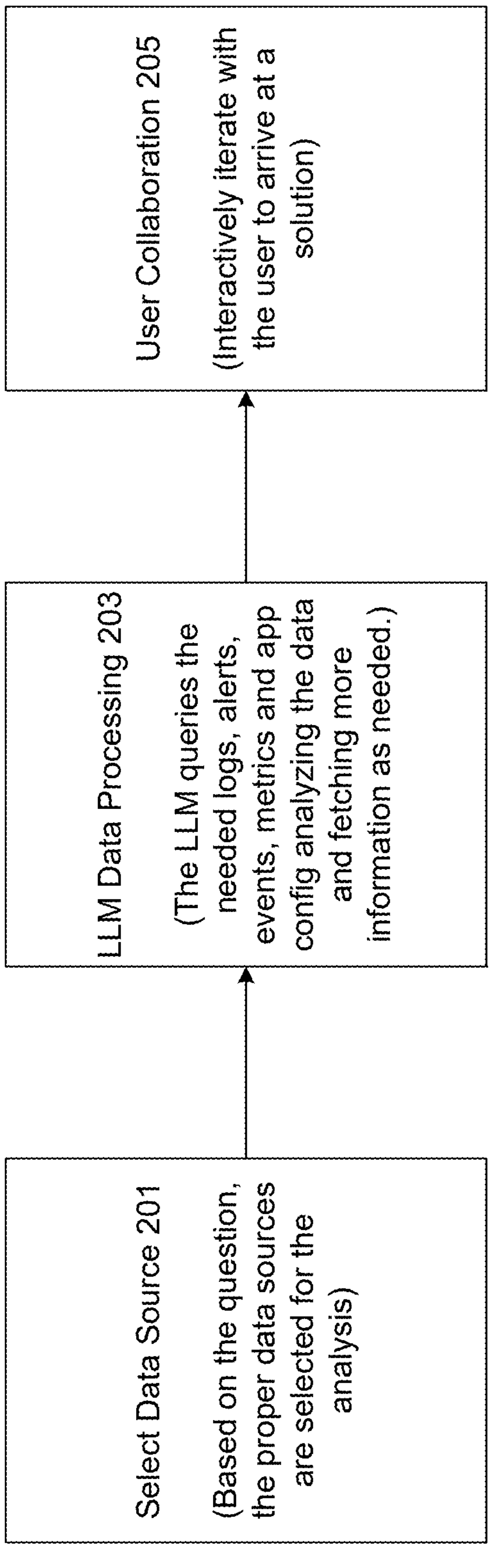
FIG. 2 illustrates an example of a system for IT Generative Operations (IT GenOps).

FIG. 2 is a diagrammatic representation illustrating one example of use of an LLM in IT Ops. Use of LLms in IT Ops is generally referred to herein as IT GenOps. According to various embodiments, LLMs can process and analyze vast amounts of data from diverse sources, such as logs, metrics, traces, and configuration files, in real-time. IT operators can interact with these models using natural language, asking questions to pinpoint issues, identify patterns, and derive insights.

According to various embodiments, a select data source 201 allows identification and retrieval of relevant telemetry data based on a user's query. Rather than ingesting all available IT telemetry indiscriminately, the system strategically selects log files, alerts, events, system traces, performance metrics, and application configurations that are most pertinent to the issue at hand. In particular embodiments, this data source selection increases efficiency by reducing the volume of unnecessary information being processed, minimizing resource consumption, and improving response accuracy. By narrowing the dataset to only what is needed, the system enhances performance while maintaining a focus on real-time issue resolution.

In particular embodiments, once the necessary data sources are identified, the data processing using an LLM begins at 203. At this stage, an LLM processes the selected telemetry data and executes queries to extract insights. The LLM is capable of analyzing logs, alerts, and infrastructure configurations while detecting anomalies, trends, and system dependencies across multiple IT environments. Unlike traditional query-based analysis, where IT personnel must manually craft and refine queries, the LLM autonomously interprets the user's intent, retrieves relevant information, and conducts iterative analysis. Additionally, the LLM can fetch supplementary data as needed, ensuring that its responses remain comprehensive and contextually relevant. In some examples, based on queries and or responses, the LLM can intelligent select and obtain additional corresponding telemetry data. This automation significantly reduces the burden on IT personnel by eliminating the need for specialized query-writing expertise while improving troubleshooting efficiency.

According to various embodiments, user collaboration 205 allows for an interactive and iterative process between IT personnel and the LLM to refine the response and arrive at an effective solution. Rather than providing a static output, the system engages in a back-and-forth dialogue, allowing users to refine their queries, request additional context, and validate proposed solutions. This approach mimics human expert troubleshooting, where iterative hypothesis testing is used to diagnose and resolve IT issues. The system's ability to learn from user feedback and dynamically adapt its responses further enhances its effectiveness.

According to various embodiments, an IT environment may include a variety of IT environment components such as a Relational Database Service (RDS) component, a container orchestration platform component, and a storage management platform component. The IT environment components may be associated with a variety of IT platforms such as AWS, Google Cloud, VMWare, and Prometheus, as well as associated data sources such as RDS transaction logs and system state logs, container deployment data, pod statuses, and storage performance, capacity, and throughput metrics. This collected data is then integrated into a centralized analytics platform where it undergoes preprocessing, including data cleaning and normalization. Advanced analytics techniques, such as machine learning algorithms and statistical analysis, are applied to identify patterns, correlations, and anomalies.

For instance, an operator might ask an LLM to identify the cause of a spike in CPU usage or to trace the source of an error across microservices. The LLM can parse the relevant data, execute complex queries, and present a coherent explanation or suggest potential solutions. This natural language interaction simplifies the diagnostic process, reduces the need for specialized query-writing skills, and accelerates problem resolution. Additionally, LLMs can learn from past interactions and improve over time, becoming more adept at identifying recurring issues and recommending preventive measures. By leveraging LLMs, IT operators can navigate the complexities of modern IT environments more efficiently, enhancing their ability to maintain system performance and reliability.

Despite their potential, LLMs also present several challenges, notably the issue of "hallucinations," where the model generates incorrect or misleading information that appears plausible. LLM hallucinations occur because these models, while powerful, do not possess true understanding or factual verification mechanisms. They generate responses based on patterns in the data they were trained on, which can lead to confidently stated inaccuracies. Additionally, LLMs require substantial computational resources for both training and operation, making them expensive and energy-intensive. They can also be opaque in their decision-making processes, making it difficult to understand how a particular response was generated. This lack of transparency can be problematic in critical IT operations where traceability and accountability are essential. Furthermore, LLMs are trained on vast datasets that may contain biased or inappropriate content, which can lead to biased outputs or the reinforcement of harmful stereotypes. Ensuring data privacy and security is another concern, as these models can potentially expose sensitive information if not properly managed.

Retrieval Augmented Generation (RAG) is an approach in natural language processing that combines the strengths of retrieval-based and generation-based models to produce more accurate and contextually relevant responses. In RAG, a retrieval component first searches a large corpus of documents or data to find the most relevant pieces of information related to a given query. These retrieved documents then serve as an additional context for a generative model, which uses them to generate a coherent and informative response. In some instances, the model cross-references generated content with verified domain-specific databases and knowledge sources in real-time, enhancing accuracy. Humans may be included in the loop to review and correct outputs.

However, various embodiments of the present invention recognize that the use of the models such as RAG in the IT Gen Ops environment is not useful and in many circumstances is actually counterproductive. According to various embodiments of the present invention, enhanced LLMs include improved guardrail mechanisms for increasing the likelihood of Generative AI accuracy in IT Gen Ops. According to various embodiments, instead of providing an LLM with increasing amounts of data, an LLM is only provided with access to IT manager specified data sources and the specified data sources are provided only in a highly structured manner.

Figure 3:
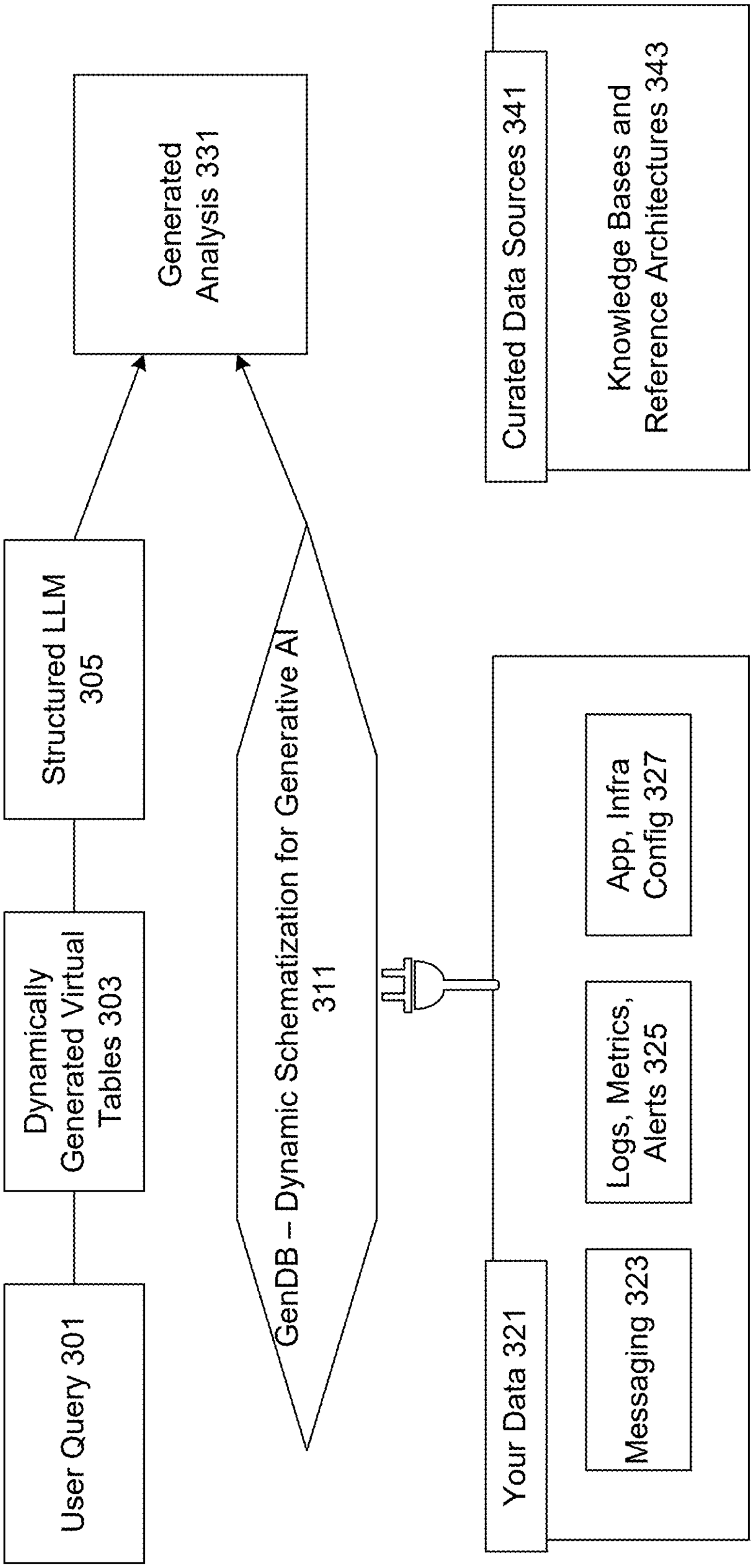
FIG. 3 illustrates an example of a system for IT GenOps having access to disparate IT platforms and associated IT data sources.

FIG. 3 is a diagrammatic representation illustrating an example of dynamic schematization for IT GenOps. According to various embodiments, a user query 301 is received. The user query 301 may regard why a particular site is slow to respond, or why particular alerts or errors have been detected in a network.

This normalized data is then stored in dynamically generated virtual tables 303, which allow for flexible and scalable schema generation. These virtual tables are designed to adapt to the varying structures and schemas of the incoming data, providing a unified view for querying and analysis.

According to various embodiments, it is recognized that Foreign Data Wrappers (FDWs) such as PostgreSQL FDWs are a particularly powerful tool for aggregating and managing diverse data types from disparate IT platforms and environments, making it easier to generate dynamic virtual tables and create an IT telemetry structured database. FDWs allow a database to interface with external data sources as if they were regular database tables. In particular embodiments, by utilizing FDWs, data from AWS CloudWatch, AWS CloudTrail, JSON logs, Microsoft Azure, Google Cloud, and VMware can be seamlessly integrated into a unified PostgreSQL database. Each data source can be accessed through a corresponding FDW, allowing real-time querying and manipulation. For example, JSON logs from Google Cloud can be parsed and queried directly, while metrics from AWS CloudWatch can be monitored alongside configuration data from VMware. This integration simplifies data management by centralizing access to multiple data formats and sources within a single relational database. Consequently, creating dynamic virtual tables 303 becomes more efficient, as FDWs allow for on-the-fly schema generation and transformation. This approach streamlines the process of building a comprehensive IT telemetry structure, providing a unified view and enhancing the ability to perform in-depth analysis and monitoring across a complex IT environment.

In particular embodiments, data 321 such as telemetry data is aggregated from various IT platforms such as Amazon Web Services (AWS) CloudWatch, AWS CloudTrail, Microsoft Azure, Google Cloud, and VMware by collecting and unifying diverse data types into a cohesive, dynamic structure. In particular embodiments, telemetry data is selected in response to an IT administrator query.

According to various embodiments data 321 including messaging 323, metrics, logs, and alerts 325, and application infrastructure configurations 327. According to various embodiments, data gathered from sensors, software applications, firmware, and hardware components to provide real-time insights in the operational status of an IT environment is referred to herein as telemetry data. By continuously capturing metrics such as CPU usage, memory consumption, network throughput, error rates, and application performance, telemetry data allows IT professionals to proactively identify issues, optimize performance, and ensure system reliability.

In particular embodiments, telemetry data from disparate sources is ingested. According to various embodiments, each type of data, whether it's a JSON log from Google Cloud, a CloudWatch metric, or a VMware alert, is parsed and normalized into a standard format.

Generated analysis 331 can then be obtained from structured LLM processing at 305 and from a generative database which is dynamically schematized for generative AI art 311.

According to various embodiments, curated data sources 341 such as IT knowledge bases and reference architectures 343 can be incorporated into enterprise IT GenOps. Knowledge bases provide a repository of domain-specific information, including best practices, troubleshooting guides, and comprehensive documentation, which can be integrated into an LLM to improve its contextual understanding and response accuracy. Reference architectures offer standardized templates and blueprints for IT systems, providing a well-defined structure for interpreting and implementing various technologies and solutions. By including these curated data sources along with only actual schematized telemetry data provided by an enterprise, the LLM can offer more structured and relevant insights. Data not provided by an enterprise remains private and is not exposed to any outside networks.

Figure 4:
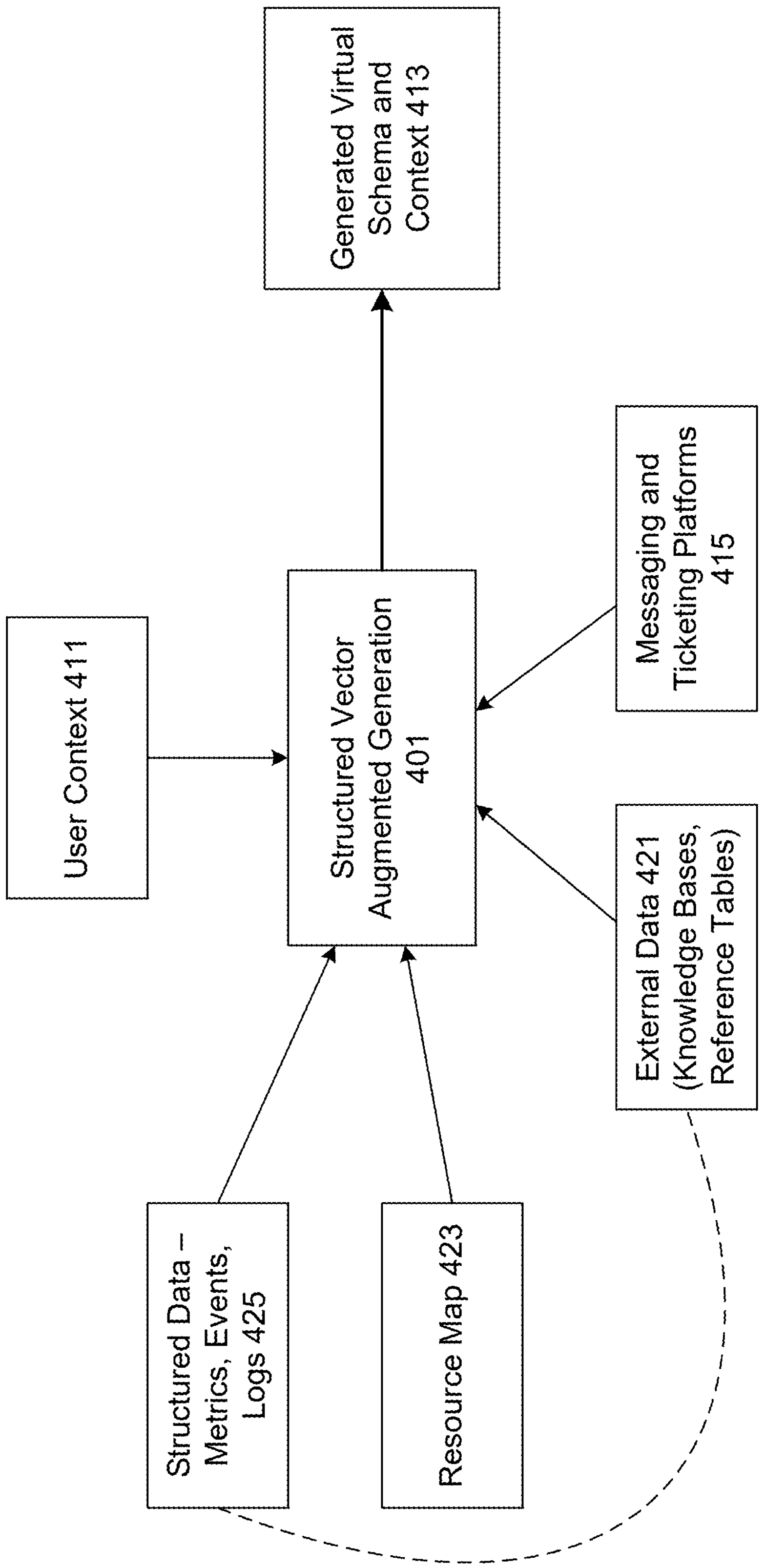
FIG. 4 illustrates an example of cognitive views for IT Telemetry.

FIG. 4 illustrates one example of structured vector augmented generation. According to various embodiments, structured vector augmented generation of a virtual schema and context involves creating a dynamic and highly contextualized data model that integrates various sources of information to provide comprehensive insights. In particular embodiments, this process begins with the ingestion of user context, which includes specific queries, user roles, and relevant historical interactions. The system then incorporates structured data from IT telemetry metrics, events, alerts, logs, and infrastructure configurations, offering a detailed view of the current state of the IT environment. According to various embodiments, a resource map is used to understand the relationships and dependencies between different components within the infrastructure.

In particular embodiments, external data sources, such as knowledge bases and reference tables, are integrated to enrich the context with domain-specific information and best practices. Messaging and ticketing platforms contribute by adding real-time communication and incident management data, ensuring that the model reflects the latest operational status and user interactions. According to various embodiments, by using structured vector representations to encode this diverse information, the system generates a virtual schema that dynamically adapts to the evolving context.

In particular embodiments, a structured vector augmented generation component 401 is a mechanism for dynamically generating a virtual schema and contextual understanding to enhance IT Generative Operations (IT GenOps) 413. In particular embodiments, Structured vector augmented generation 401 receives input from multiple sources, including user context 411, which provides historical interactions, IT personnel queries, access privileges, and role-based contextual information. According to various embodiments, this user context 411 allows the system to tailor responses based on previous troubleshooting actions, improving the accuracy and efficiency of IT operations. In particular embodiments, Messaging and ticketing platforms 415 are integrated into the process to incorporate real-time incident reports, IT helpdesk tickets, and communication logs from platforms such as ServiceNow, Jira, or Zendesk. According to various embodiments, these ticketing platforms allow the system to track active issues, monitor escalations, and refine recommendations based on ongoing IT challenges.

In particular embodiments, external data 421, including knowledge bases and reference tables, provides domain-specific information, troubleshooting guides, compliance frameworks, and best practices. According to various embodiments, the system references this external knowledge to enhance the contextualization of telemetry insights, ensuring that generated responses align with verified IT protocols and industry standards. Additionally, resource map 423 is incorporated into the structured vector augmentation process, mapping relationships and dependencies among IT infrastructure components such as servers, cloud services, network architecture, storage systems, and containerized applications. In particular embodiments, the resource map 423 allows the system to correlate telemetry anomalies with service dependencies, improving failure impact analysis and root cause identification.

According to various embodiments, structured data 425 including metrics, events, and logs is collected from disparate IT telemetry sources, including performance metrics, system logs, alerts, traces, and infrastructure configurations. In particular embodiments, this structured data serves as the foundational input for the structured vector augmented generation 401, providing that all insights and generated responses are backed by real-time telemetry rather than unstructured or speculative data. Additionally, according to various embodiments, structured data 425 may also be connected to external data 421, allowing IT telemetry signals to be reinforced, further improving the accuracy of generative AI diagnostics.

According to various embodiments, the structured vector augmented generation 401 process synthesizes all of these inputs to produce a generated virtual schema and context 413, which dynamically organizes and structures the aggregated data for query execution and IT operations analysis. According to various embodiments, this virtual schema allows IT personnel to interact with a structured Large Language Model (LLM) using natural language queries, allowing real-time issue resolution, anomaly detection, and predictive analysis without the need for manually crafted database queries. In particular embodiments, by dynamically schematizing telemetry data and contextual knowledge, the system reduces operational inefficiencies and enhances IT observability, ensuring that responses generated by the LLM are actionable, accurate, and aligned with enterprise IT policies. Furthermore, according to various embodiments, this structured approach minimizes LLM hallucinations by ensuring that generated insights are exclusively based on verified, dynamically structured data rather than relying on open-ended generative outputs.

Figure 5:
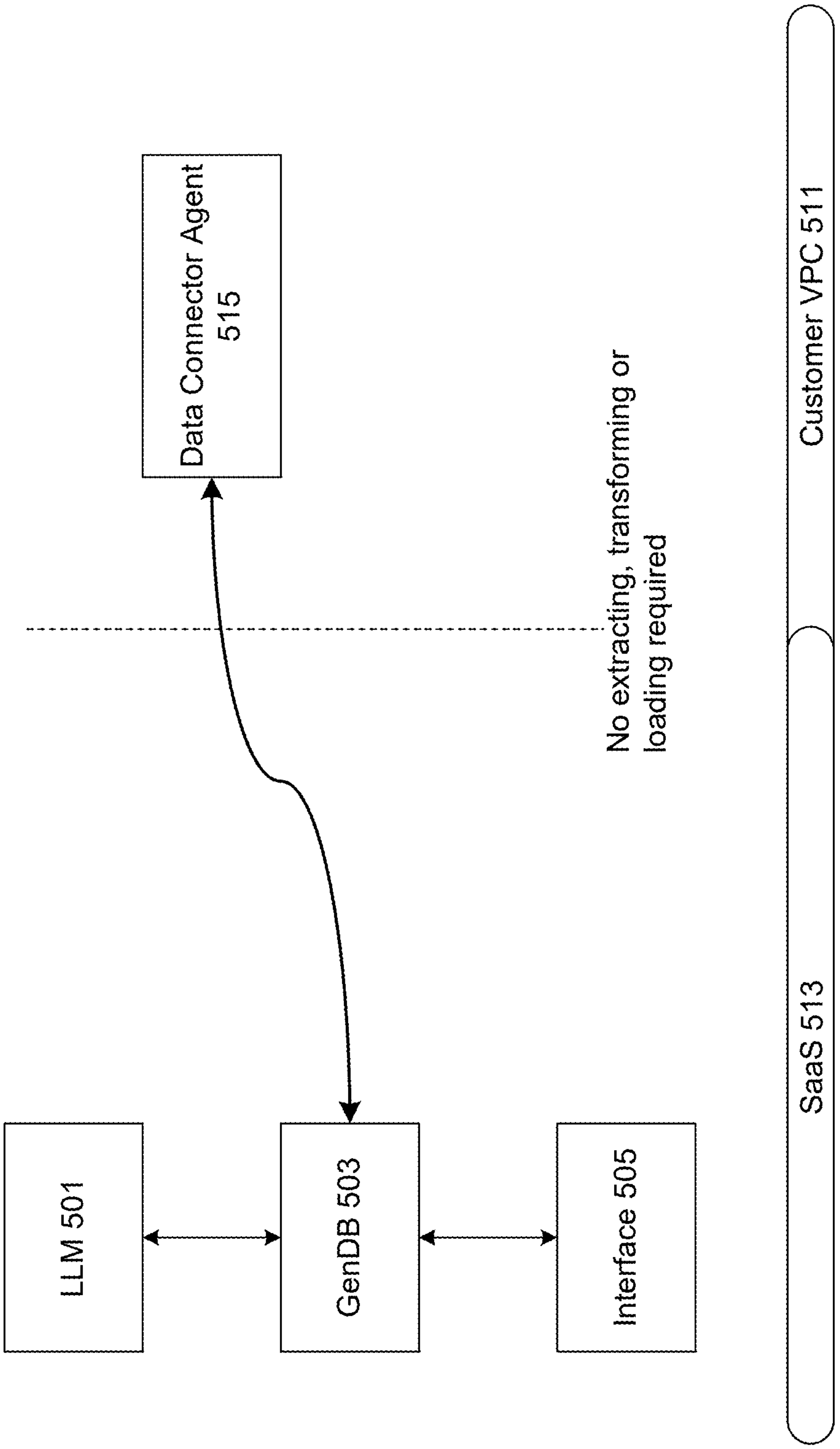
FIG. 5 illustrates an example of IT GenOps and a Virtual Private Cloud (VPC).

FIG. 5 illustrates one example of integration of a structured LLM with a customer Virtual Private Cloud (VPC). According to various embodiments, a structured IT Gen Ops Software as a Service (SaaS) Large Language Model (LLM) 513 is connected to a customer Virtual Private Cloud (VPC) 511 using a data connector agent 515. In particular embodiments, the data connector agent establishes a secure and efficient data transfer pathway between the GenOps LLM and the private network environment of the customer and can be deployed within the customer VPC. According to various embodiments, the data connector agent ensures that data transfer complies with security policies and encryption standards, protecting sensitive information during transit. Additionally, it can handle authentication and authorization, ensuring that only approved data and commands pass between the GenOps LLM and the customer VPC.

This structured approach reduces the risk of LLM hallucinations by using cognitively generated insights from dynamically schematized telemetry data and knowledge and architectural frameworks to deliver coherent, practical, and actionable advice. This integration enables the LLM to support complex IT environments more effectively, aiding in design, implementation, troubleshooting, and optimization tasks with a high degree of reliability and expertise. According to various embodiments, the only enterprise data provided is selected, schematized telemetry data in particular table database table formats.

According to various embodiments, a technique for implementing IT GenOps is provided. An IT administrator query is received at an interface 505. Upon receiving a query, the IT LLM 501 determines the relevant sources and accesses telemetry data, including traces, log files, infrastructure configuration details, and alerts from disparate IT environments such as Dynatrace, Datadog, Google Cloud, AWS CloudWatch, and enterprise servers for analysis. This data is dynamically schematized into virtual tables, allowing structured and flexible analysis in a GenDB 503. The system can fetch additional information as required to refine the insights. In certain implementations, Postgres Foreign Data Wrappers (FDWs) are used to seamlessly aggregate disparate data types into a unified schema. This approach allows the user to interactively iterate with the IT LLM 501 to arrive at practical and usable solutions.

Figure 6:
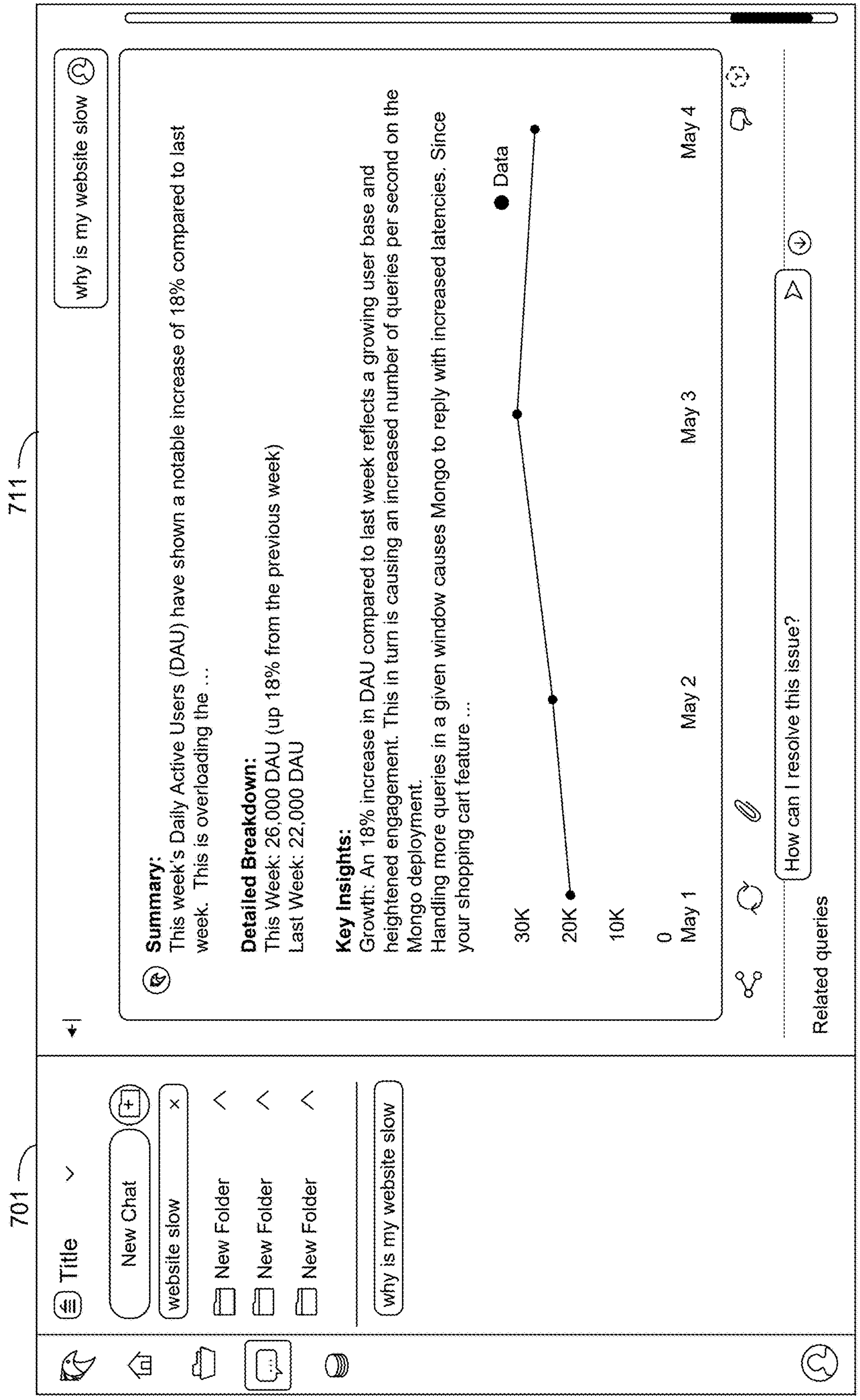
FIG. 6 illustrates an example of a IT GenOps interface.
Figure 7A:
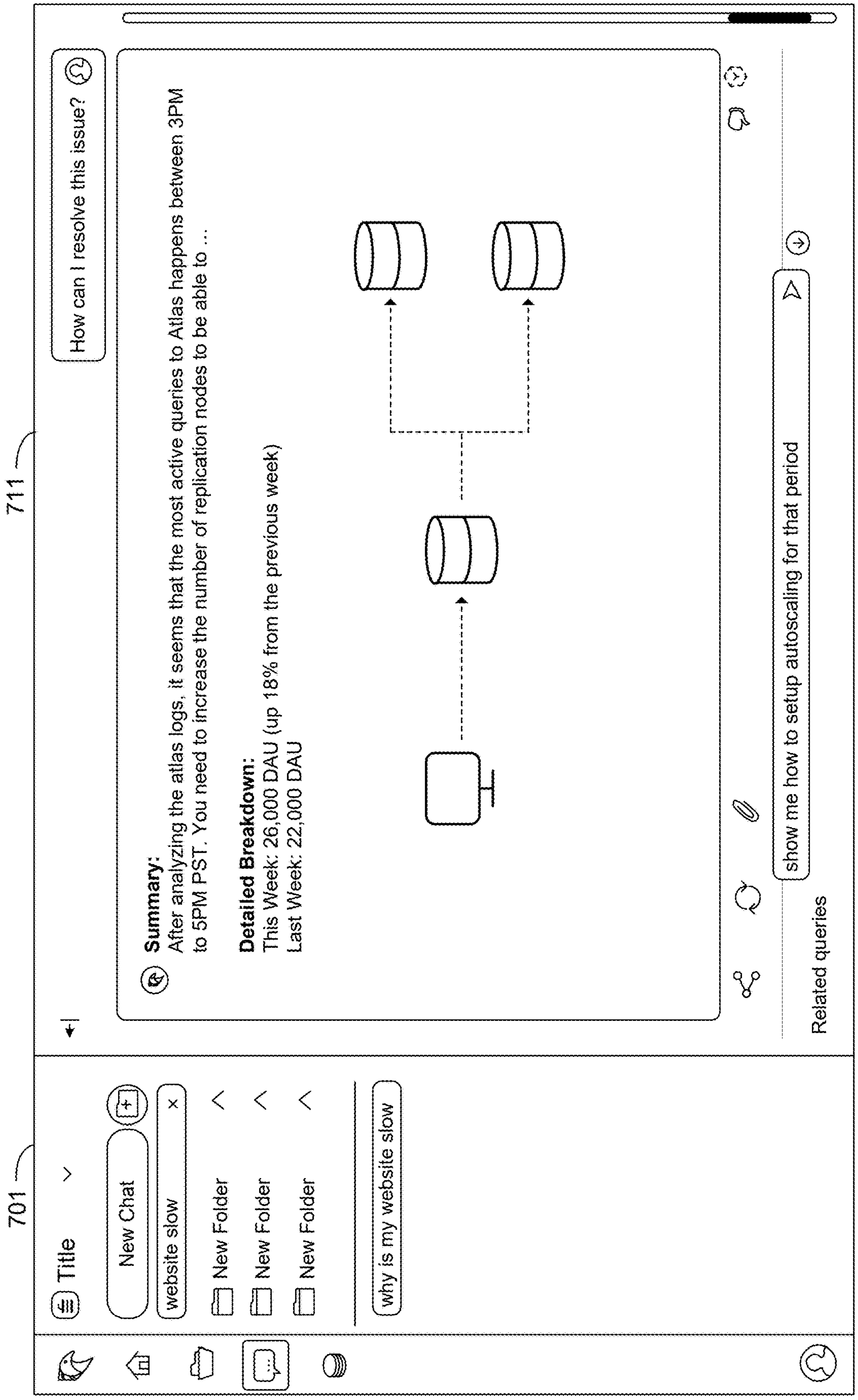
FIG. 7A illustrates an example of an IT GenOps suggested resolution.
Figure 7B:
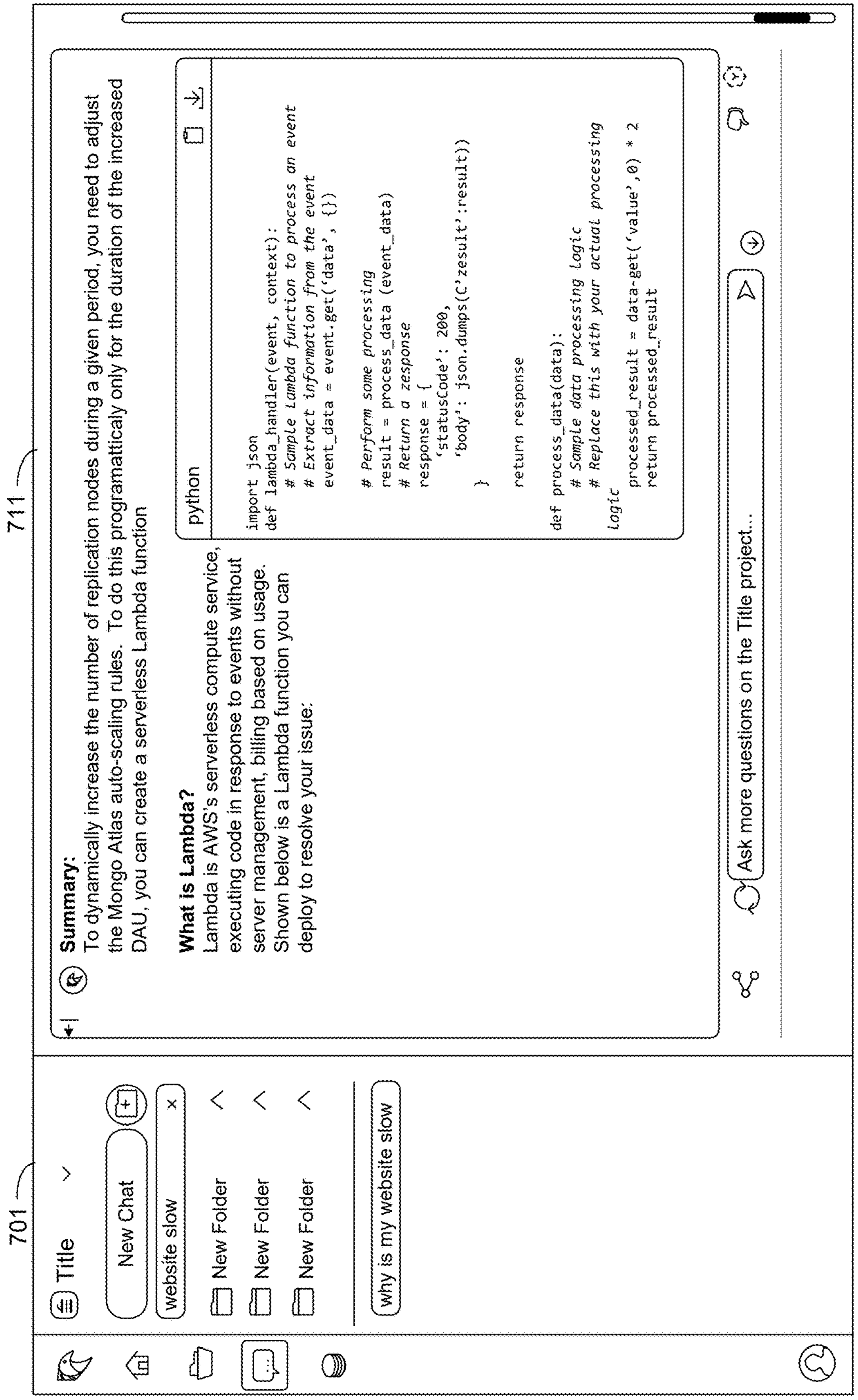
FIG. 7B illustrates an example of an IT GenOps real-time solution.

FIGS. 6, 7A, and 7B are diagrammatic representations illustrating examples of IT GenOps LLM user interfaces. According to various embodiments, an IT GenOps user interface is designed to provide IT administrators with a seamless and intuitive platform for querying a structured Large Language Model (LLM) that utilizes a schematized database of telemetry data. In particular embodiments, a new chat button in a query history area 701 allows users to initiate a new query session. In particular embodiments, IT administrators can enter detailed questions about their IT environment.

According to various embodiments, a response area 711 displays the results generated by the LLM. In particular embodiments, the response is organized into three distinct sections for clarity and comprehensiveness. The first section provides a summary of the findings, giving users a quick overview of the key points. The second section offers a detailed breakdown, presenting in-depth information extracted from the schematized telemetry data, including logs, metrics, alerts, and infrastructure configurations. This breakdown helps administrators understand the nuances of the response and the underlying data. The third section highlights key insights, which are actionable recommendations or critical observations derived from the analysis. This structured approach ensures that IT administrators receive not only the raw data but also valuable context and guidance, empowering them to make informed decisions and efficiently manage their IT infrastructure. In particular embodiments, suggested solutions may include code to implement in order to resolve issues.

Figure 8:
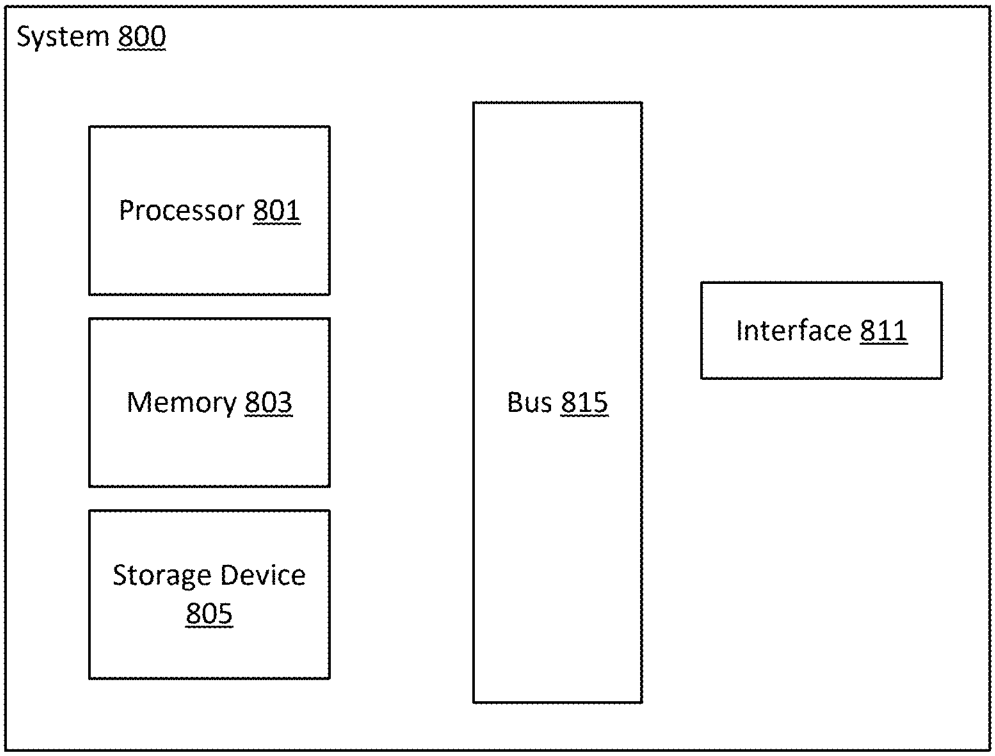
FIG. 8 illustrates one example of a computing device.

FIG. 8 illustrates one example of a computing device, configured in accordance with some embodiments. According to various embodiments, system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a web server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities. Accordingly, Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A system, comprising:

a network interface configured to periodically access Information Technology (IT) telemetry data from a plurality of disparate IT platforms including a plurality of servers, network devices, and applications, the IT telemetry data associated with log files, system traces, metrics, alerts, and infrastructure configurations for monitoring and troubleshooting an enterprise IT system;

a processor configured to dynamically schematize the IT telemetry data from the plurality of disparate IT platforms, wherein the IT telemetry data is dynamically schematized into an IT telemetry structured database, wherein the IT telemetry data is accessed from the plurality of disparate IT platforms through tables within the IT telemetry structured database, the IT telemetry data accessed using commends including SELECT, INSERT, and UPDATE;

storage configured to maintain the IT telemetry structured database for a Large Language Model (LLM), the Large Language Model generating a plurality of schematic inferences from the IT telemetry structured database; and a user interface configured to provide a response to a first query from an enterprise IT administrator regarding the enterprise IT system using a response from the LLM.

2. The system of claim 1, wherein the IT telemetry data is accessed using PostgreSQL Foreign Data Wrappers (FDWs).

3. The system of claim 1, wherein a first subset of the IT telemetry data is selected based on the first query from the enterprise IT administrator.

4. The system of claim 1, wherein a second subset of the IT telemetry data is selected based on a first response to the first query from the enterprise IT administrator.

5. The system of claim 1, wherein Foreign Data Wrappers (FDWs) are used to dynamically schematize the IT telemetry data into the IT telemetry structured database.

6. The system of claim 5, wherein the FDWs are used to generate dynamic virtual tables and create the IT telemetry structured database.

7. The system of claim 6, wherein a first FDW is associated with a first external data source and a second FDW is associated with a second external data source.

8. The system of claim 7, wherein the first FDW allows for on-the-fly schema generation and transformation.

9. The system of claim 8, wherein a repository of domain-specific information including best practices, troubleshooting guides, and comprehensive documentation is provided along with IT telemetry data.

10. The system of claim 9, wherein the IT telemetry structured database and the LLM are provided as Software as a Service (SaaS) connected to a Virtual Private Cloud (VPC).

11. A method, comprising:

periodically accessing Information Technology (IT) telemetry data from a plurality of disparate IT platforms including a plurality of servers, network devices, and applications, the IT telemetry data associated with log files, system traces, metrics, alerts, and infrastructure configurations for monitoring and troubleshooting an enterprise IT system;

dynamically schematizing the IT telemetry data from the plurality of disparate IT platforms, wherein the IT telemetry data is dynamically schematized into a IT telemetry structured database;

accessing the IT telemetry data from the plurality of disparate IT platforms through tables within the IT telemetry structured database, the IT telemetry data accessed using commends including SELECT, INSERT, and UPDATE;

providing the IT telemetry structured database to a Large Language Model (LLM), the Large Language Model generating actionable advice from the IT telemetry structured database; and responding to a first query from an enterprise IT administrator regarding the enterprise IT system using a response from the LLM.

12. The method of claim 11, wherein the IT telemetry data is accessed using PostgreSQL Foreign Data Wrappers (FDWs).

13. The method of claim 11, wherein a first subset of the IT telemetry data is selected based on the first query from the enterprise IT administrator.

14. The method of claim 11, wherein a second subset of the IT telemetry data is selected based on a first response to the first query from the enterprise IT administrator.

15. The method of claim 11, wherein Foreign Data Wrappers (FDWs) are used to dynamically schematize the IT telemetry data into the IT telemetry structured database.

16. The method of claim 15, wherein the FDWs are used to generate dynamic virtual tables and create the IT telemetry structured database.

17. The method of claim 16, wherein a first FDW is associated with a first external data source and a second FDW is associated with a second external data source.

18. The method of claim 17, wherein the first FDW allows for on-the-fly schema generation and transformation.

19. The method of claim 18, wherein the IT telemetry structured database and the LLM are provided as Software as a Service (SaaS) connected to a Virtual Private Cloud (VPC).

20. A non-transitory computer readable medium, comprising:

computer code for periodically accessing Information Technology (IT) telemetry data from a plurality of disparate IT platforms including a plurality of servers, network devices, and applications, the IT telemetry data associated with log files, system traces, metrics, alerts, and infrastructure configurations for monitoring and troubleshooting an enterprise IT system;

computer code for dynamically schematizing the IT telemetry data from the plurality of disparate IT platforms, wherein the IT telemetry data is dynamically schematized into a IT telemetry structured database;

computer code for accessing the IT telemetry data from the plurality of disparate IT platforms through tables within the IT telemetry structured database, the IT telemetry data accessed using commends including SELECT, INSERT, and UPDATE;

computer code for providing the IT telemetry structured database to a Large Language Model (LLM), the Large Language Model generating actionable advice from the IT telemetry structured database; and computer code for responding to a first query from an enterprise IT administrator regarding the enterprise IT system using a response from the LLM.

* * * * *